June 14, 1927.
C. D. BURNEY
1,632,169
LIGHTER-THAN-AIR AIRCRAFT
Filed Jan. 23, 1925   2 Sheets-Sheet 1
Fig. 1.
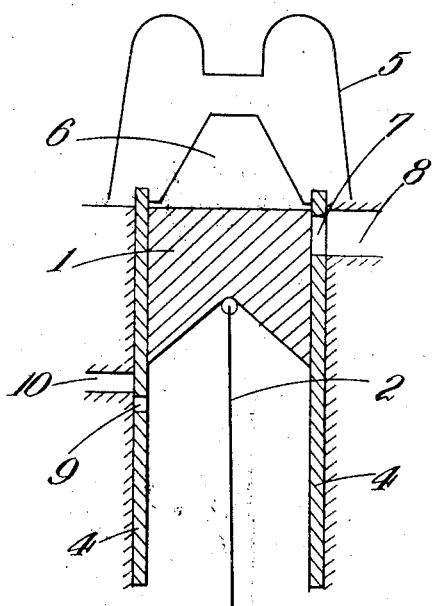
Fig. 2.
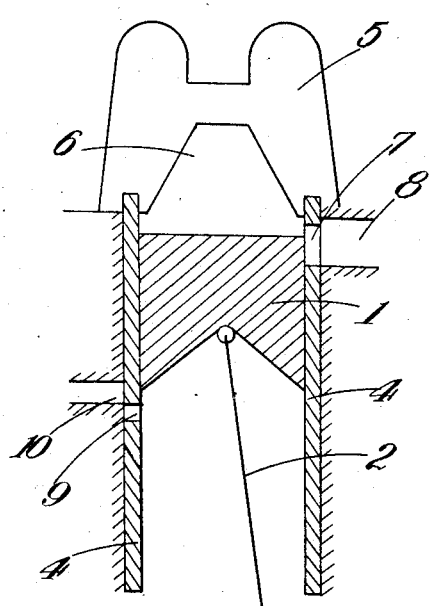
Fig. 5.   Fig. 6.
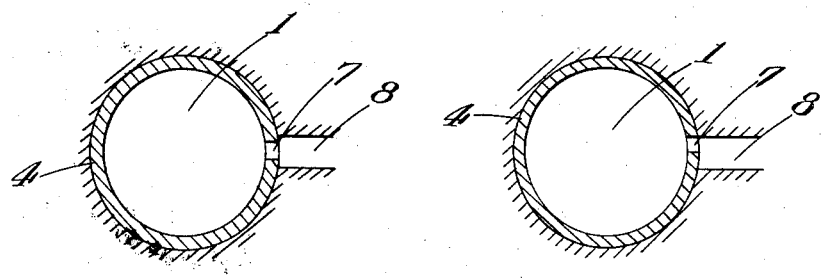
Inventor
Charles Denniston Burney June 14, 1927.  C. D. BURNEY  1,632,169
LIGHTER-THAN-AIR AIRCRAFT
Filed Jan. 23, 1925  2 Sheets-Sheet 2

Inventor
Charles Dennistoun Burney
By
Pennie, Davis, Marvin and Edmonds
Attorneys

Patented June 14, 1927.

1,632,169

UNITED STATES PATENT OFFICE.

CHARLES DENNISTON BURNEY, OF WESTMINSTER, LONDON, ENGLAND, ASSIGNOR TO AIRSHIP GUARANTEE COMPANY LIMITED, OF WESTMINSTER, ENGLAND, A BRITISH COMPANY.

LIGHTER-THAN-AIR AIRCRAFT.

Application filed January 23, 1925, Serial No. 4,175, and in Great Britain January 26, 1924.

This invention relates to lighter-than-air air-craft.

It has already been proposed to supply hydrogen from the gas bags or aerostats of lighter-than-air air-craft, to the power motors of the ship, the hydrogen being either mixed with air and burnt in hydrogen engines or mixed with air and supplied simultaneously with petrol to the engines. When hydrogen and petrol were used simultaneously it was proposed to regulate the relative proportions so that the amount of hydrogen consumed compensates for the decrease in load due to consumption of petrol, the object aimed at in such cases being to maintain the ship in equilibrium so that it shall neither gain nor lose buoyancy owing to the consumption of petrol and also to avoid the ship becoming lighter during or towards the end of the voyage. For various reason, however, it is desirable that there should be a reserve of buoyancy especially at the end of the voyage when it is desired to bring the airship into equilibrium for mooring purposes.

Experience has shown, however, that it is impossible merely to reduce sufficiently the relative proportions of hydrogen petrol so as to cause the ship to gain materially in buoyancy without producing detonations in the engine cylinders which interfere with the efficiency of the engine and consequently such relative proportions as a thousand cubic feet of hydrogen to ten gallons of petrol have usually been employed, thus consuming an undue proportion of hydrogen.

According to one feature of the present invention an engine for the simultaneous consumption of hydrogen and liquid fuel has its parts so constructed and arranged that the relative proportions of hydrogen and liquid fuel can be so adjusted as to leave the airship substantially lighter at the end of the journey than at the commencement. To this end the liquid fuel and the burning agent (i. e. hydrogen) together with a charge of air, are introduced into the cylinder in such a manner that although the liquid fuel and the hydrogen are freely mixed together they are not too freely mixed with the air (which is of course eventually required to complete the chemical combustion), so that the detonations are avoided as the rate of burning is relatively slow.

A suitable method of attaining the aforesaid result is to withdraw the hydrogen from the aerostats and introduce a controlled volume thereof into the engine cylinders simultaneously with the liquid fuel at the commencement of the suction stroke, the air being sucked in or introduced at a later stage in the suction stroke. I have discovered that by this method the relative proportions by weight of hydrogen to liquid fuel may be reduced to about 16 to 1 as it would appear that when the hydrogen and liquid fuel are introduced in this way a strata rich in hydrogen and liquid fuel is formed in the upper part of the cylinder above the strata chiefly composed of air in the lower part thereof, so that the combustible mixture at the time of ignition is richer in certain zones of the cylinder than in others and a slow combustion takes place which avoids the aforesaid objectionable detonations.

Heretofore, it has only been possible to burn medium and heavy hydrocarbon oils efficiently in engines of the semi-Diesel or Diesel type where a high temperature cycle is obtained. I have discovered, however, that the use of hydrogen as a burning agent enables medium and heavy hydrocarbon oils to be used on low temperature cycle engines of the ordinary petrol consuming type, and, according to a further feature of the present invention and instead of using petrol or a light hydrocarbon oil as previously proposed, a medium hydrocarbon oil, such as kerosene, is employed together with a charge of hydrogen in an engine of the petrol consuming or like type so that a low temperature cycle is obtained, as distinguished from the high temperature cycle which is obtained in engines of the Diesel or semi-Diesel types when consuming medium and heavy hydrocarbon oils alone. The aforesaid medium or heavy hydrocarbon oils may be introduced or pumped in, in conjunction with a charge of hydrogen, at the commencement of the suction stroke, the charge of air being introduced preferably in the manner above described, i. e., towards the end of the suction stroke. Apart from increasing the reliability and efficiency of the engine the use if a low temperature cycle reduces the temperature of the exhaust gases, thus diminishing, in the case of an airship any liability to fire due to the heat of the exhaust gases. Moreover a heavy hydrocarbon oil can be chosen having a flash point which will avoid its ignition in the event of the rupture and sparking of an electric lead in its proximity.

In order that the said invention may be clearly understood and readily carried into effect the same will now be described more fully with reference to the accompanying drawing, which illustrates diagrammatically a four stroke single sleeve valve engine operating on a low temperature cycle and adapted for the consumption of hydrogen and a medium hydrocarbon oil, such as kerosene, and in which:—

Figure 1 shows the position of the sleeve valve and piston relatively to the ports through which the kerosene and hydrogen, and the air, respectively, are introduced into the engine cylinder, the crank being on upper dead centre and the suction stroke being about to commence.

Figure 2 illustrates the relative position of the aforesaid parts when the suction stroke has just commenced.

Figures 5, 6, 7 and 8 are plan views corresponding to Figures 1, 2, 3 and 4 showing the successive relative positions of the port in the sleeve valve and the port in the cylinder through which the hydrogen and kerosene are introduced.

1 is the piston; 2 the connecting rod; 3 the crank; 4 the sleeve; 5 the cylinder head and 6 the combustion chamber; 7 is the port in the sleeve and 8 is the port in the cylinder casing through which the kerosene and hydrogen are introduced. 9 is the port in the sleeve and 10 the port in the cylinder wall through which the air enters the cylinder.

Figure 3:
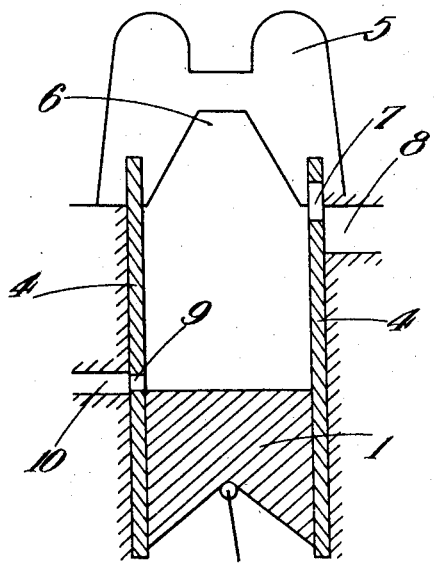
Figure 3 is a further stage in the suction stroke.
Figure 4:
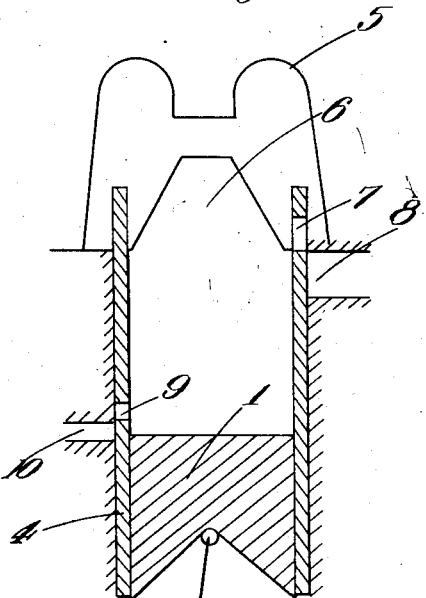
Figure 4 illustrates the position of the said parts at the commencement of the compression stroke.
Figure 4:
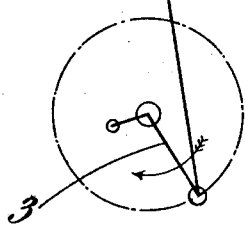
Figure 4:
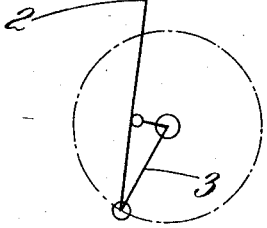
Figure 7:
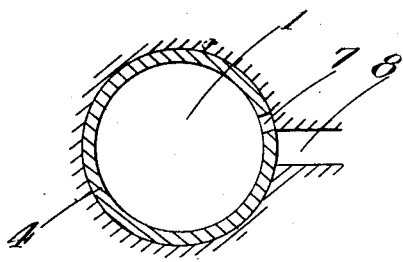
Figure 8:
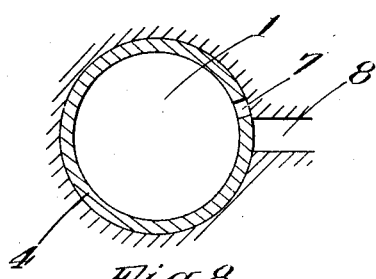

It will be observed on reference to Figure 1 that prior to the commencement of the suction stroke and when the crank 3 is on upper dead centre the piston 1 closes the ports 7 and 8 through which the kerosene and hydrogen are introduced and which are shown in register with one another, while the sleeve valve 4 closes the port 10 through which air is introduced. As the suction stroke commences and as shown at Figure 2 kerosene and hydrogen are sucked or pumped into the combustion chamber 6 above the piston 1, as the latter descends into the cylinder, the air port 10 being still closed. When the piston 1 reaches the position shown at Figure 3, the sleeve 4 moves into a position where it closes the port 8 through which the kerosene and hydrogen are introduced and immediately thereafter the port 9 in the sleeve 4 registers with the port 10 through which the air is introduced. The air which is sucked in will therefore in the main collect beneath the charge of hydrogen and kerosene in the upper part of the cylinder. At the commencement of the compression stroke and as shown at Figure 4 the supply of air is also cut off, but owing to the fact that the air has been introduced at a later stage in the suction stroke than the supply of kerosene and hydrogen, the air at the end of the compression stroke and on ignition taking place, will not be too freely mixed with the kerosene and hydrogen so that a richer mixture will be formed in certain parts of the cylinder than in others. Consequently, and although all the air introduced is required for complete combustion the rate of combustion will be slower than would be the case were the mixture of air and fuels, at the time of ignition, homogeneous. At the end of the compression stroke the charge is ignited by an electric spark in the usual manner. The exhaust stroke is similar to that of the usual four-stroke single sleeve valve engines, the sleeve being of course provided with exhaust ports (not shown) which are uncovered during the exhaust stroke and through which the products of combustion are expelled in the usual manner.

Each engine or engine cylinder may be provided with a suction pump which delivers the hydrogen directly to a separate pipe communicating with the inlet port 8 in the engine cylinder so that the hydrogen is introduced to the engine cylinder in the manner aforesaid i. e. simultaneously with and through the same port as the kerosene, or, alternatively, it may be admitted through a separate port or ports.

The hydrogen may be drawn from the gas bags through a connection between each gas bag and a hydrogen main which extends longitudinally of the airship, the connection between each bag and the hydrogen main being controlled by a stop valve of suitable design. From the aforesaid gas main, downcomers may be provided leading to the suction pump of each engine and thence either to a special pipe for the separate introduction of the hydrogen, or to the pipe through which the kerosene is also introduced to the engine cylinders. By providing suction pumps as aforesaid and a hydrogen main which communicates through valves with each of the gas bags of the airship, any bag can be utilized as desired to supply the engine with hydrogen, thus preserving the fore and aft trim of the airship.

What I claim and desire to secure by Letters Patent of the United States is:—

1. A method of regulating the buoyancy of lighter-than-air air-craft, which comprises introducing liquid fuel and the buoyant hydrogen into the engine cylinders and admitting a separate charge of air into said cylinders at a different time interval whereby the liquid fuel and hydrogen, while being freely mixed together, are not too freely mixed with the air, and the rate of combustion is relatively slow.

2. A method of regulating the buoyancy of lighter than air air-craft, which comprises introducing a control volume of the buoyant hydrogen into each engine cylinder simultaneously with a charge of liquid fuel at the commencement of the suction stroke, and in introducing a charge of air at a different time interval to that at which the hydrogen is admitted thereto so that the hydrogen and liquid fuel are mixed with the air in the desired portions.

3. A method of regulating the buoyancy of lighter-than-air air-craft, substantially as described in claim 2 in which the air is introduced into each engine cylinder before the port through which the combined charge of liquid fuel and hydrogen is introduced to the cylinder is closed.

4. A method of regulating the buoyancy of lighter-than-air air-craft, substantially as described in claim 2 in which the air is introduced into each engine cylinder while the piston is adjacent the end of the intake stroke.

5. A method of regulating the buoyancy of lighter-than-air air-craft, which comprises introducing into each cylinder of the engine a combined charge of the buoyant hydrogen and liquid fuel so proportioned that the buoyancy of the craft will be greater at the end of the journey than at the commencement thereof, and also admitting into each engine cylinder at a different time interval a separate charge of air.

6. A method of regulating the buoyancy of lighter-than-air air-craft, in which part of the buoyant hydrogen in the gas bag is supplied to the engine cylinders along with the fuel, characterized by the fact that the percentage of hydrogen employed in the mixture of hydrogen and liquid fuel is reduced without impairing the efficiency of the engine by admitting the air to the engine cylinders at a different time interval to that at which the hydrogen and liquid fuel are admitted thereto.

CHARLES DENNISTON BURNEY.